April 18, 1967 E. A. SCHLERNITZAUER 3,314,383
METHOD AND APPARATUS FOR VACUUM MIXING FOOD EMULSIONS
Filed May 11, 1964 5 Sheets-Sheet 3

INVENTOR.
EDWARD A. SCHLERNITZAUER
BY R. G. Story
ATTORNEY.

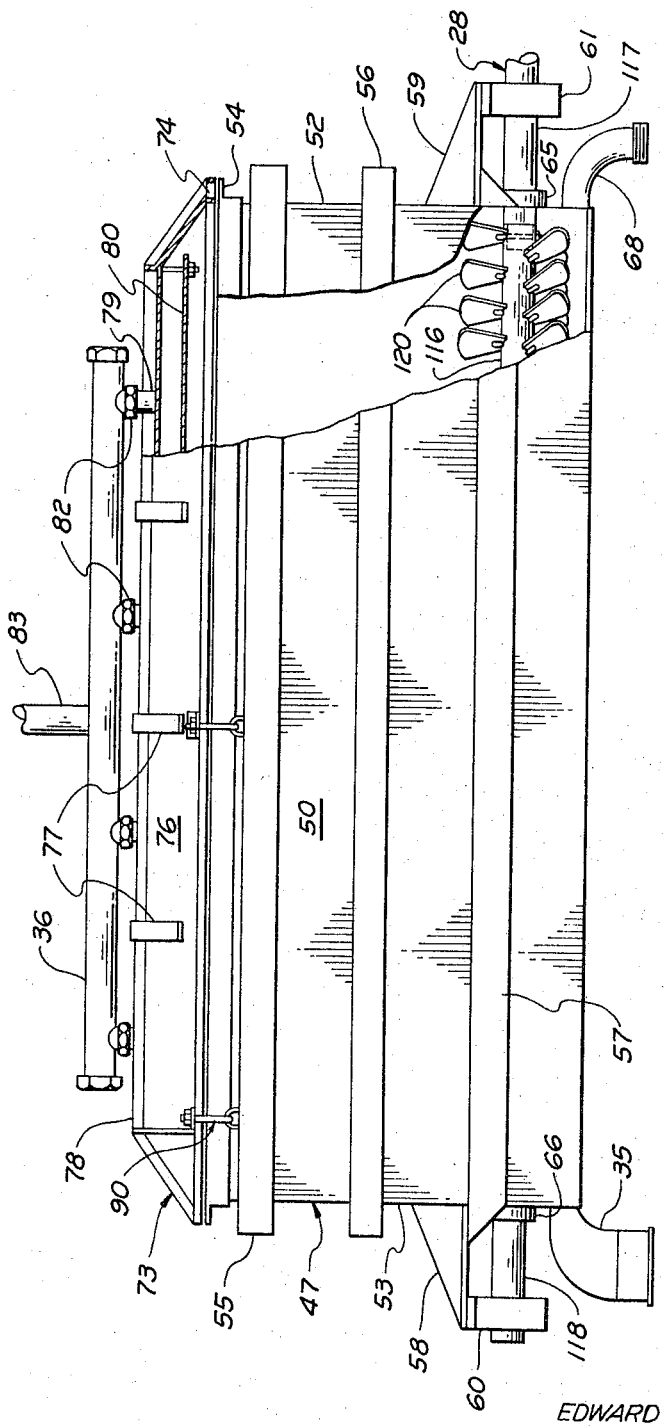

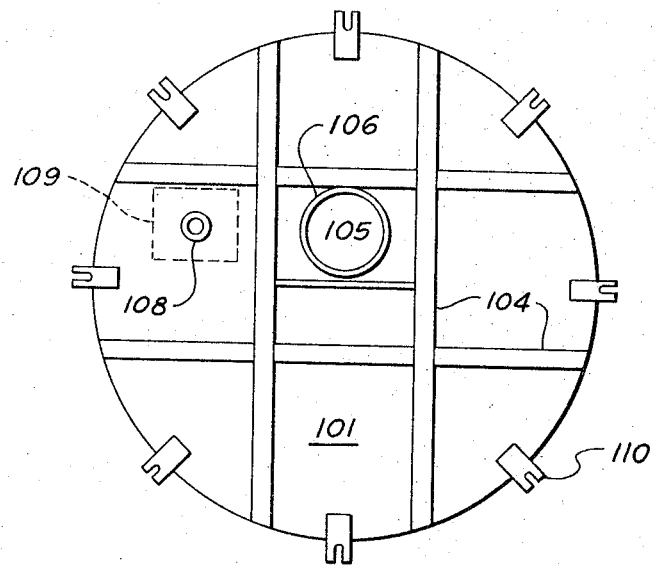
Fig. 6
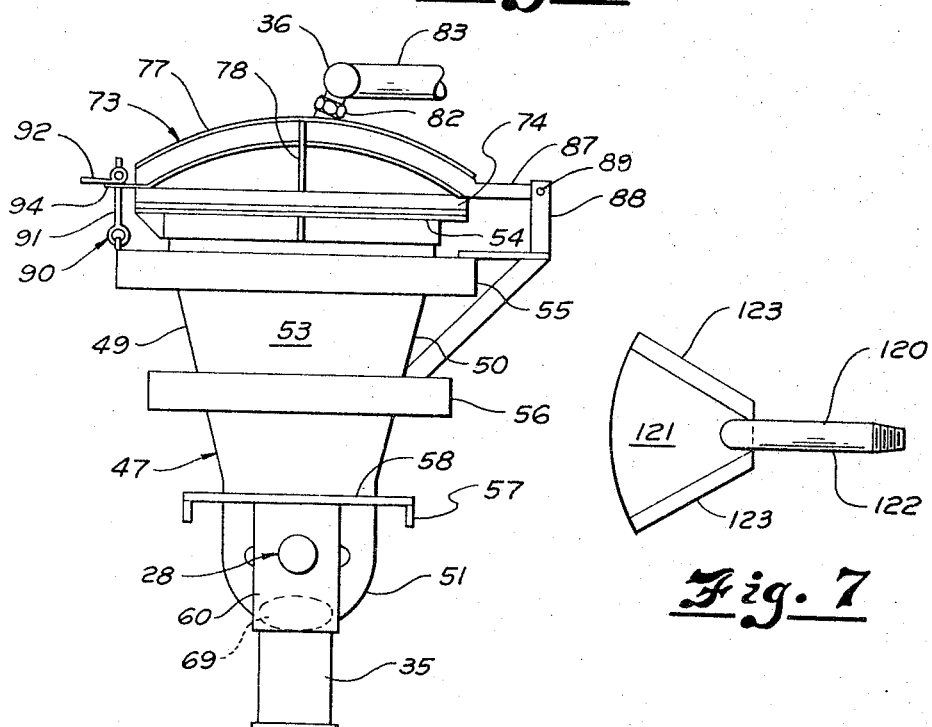
Fig. 5
Fig. 7
INVENTOR.
EDWARD A. SCHLERNITZAUER
BY R.H. Story
ATTORNEY.

United States Patent Office 3,314,383
Patented Apr. 18, 1967

3,314,383
METHOD AND APPARATUS FOR VACUUM
MIXING FOOD EMULSIONS
Edward A. Schlernitzauer, Chicago, Ill., assignor to Swift
& Company, Chicago, Ill., a corporation of Illinois
Filed May 11, 1964, Ser. No. 366,362
8 Claims. (Cl. 107—54)

The present invention involves a novel method and apparatus for vacuum mixing; and more specifically relates to an improved method and apparatus for the continuous vacuum mixing of a stream of food emulsion.

In the food industry, and particularly in the meat packing industry, it is highly advantageous to both thoroughly mix food emulsions to obtain a homogeneous product, and also to deaerate such emulsions to remove occluded air and avoid further occlusion by exposing the emulsion to a subatmospheric environment. In the meat packing industry these steps are highly advantageous in the preparation of various sausage emulsions, such as for frankfurters, to obtain a finished product of uniform texture and without voids caused by pockets of air.

In the past, both mixing and deaeration have mainly been accomplished by batch operations wherein meat emulsions, or the like, are first prepared in a chopper and then transferred bodily, as a batch, to a mixer. Such batches of emulsion were then exposed within the mixer to a vacuum while being agitated for a period of time; and thereafter the vacuum was broken and the emulsions removed as a batch for further processing.

Obviously the industry is in need of a suitable method and apparatus for mixing and vacuumizing emulsion on a continuous basis. That is, both vacuumizing and mixing should be undertaken on a continuously flowing stream of product for maximum economies of production to be obtained.

Accordingly, it is a principal object of this invention to provide an improved method and apparatus for both mixing and evacuating a continuous stream of food emulsion.

It is a further object of the present invention to provide an improved method and apparatus for continuously mixing and vacuumizing a stream of food product at a given rate and accumulating said product under subatmospheric conditions for discharge to further processing.

Basically the method of present invention comprises the continuous delivery of a stream of food emulsion to a zone within which the stream may be maintained at a given level. The atmosphere is exhausted from within that zone and the stream of emulsion is continuously agitated to both mix the emulsion and expose it to the evacuated environment. Thereafter the emulsion is discharged from the zone and preferably transferred to a second holding zone also maintained under vacuum conditions from which it is pumped upon the demand of further processing operations.

Fundamentally the apparatus devised for performing the foregoing method comprises a first chamber means for maintaining a flowing body of emulsion and a delivery means connected to one end of the first chamber means to introduce a continuous stream of emulsion thereto. Agitating means are provided within the first chamber means to continuously mix the stream of emulsion and a vacuum means is connected to the first chamber means to exhaust the air therefrom. At the opposite end of the first chamber means a transfer means is provided for discharging the emulsion therefrom. Preferably the transfer means is connected to a second chamber which is also maintained under vacuum and acts to accumulate food emulsion from the first chamber. A pumping means is connected to the second chamber to deliver the food emulsion therefrom upon demand.

Further objects and advantages of the present invention will become obvious upon reading the following description of a preferred embodiment of the invention in conjunction with the drawings wherein:

FIGURE 4 is a side view of a part of the apparatus of FIGURE 1 comprising a mixing chamber with parts broken away to show the interior thereof and an agitating means;

FIGURE 5 is an end view of the apparatus of FIGURE 4;

FIGURE 6 is a plan view of a portion of the apparatus of FIGURE 1 comprising the hopper; and FIGURE 7 is a detail view of a part of the agitator means shown in FIGURE 4.

Concerning the method of the present invention, it is preferred that emulsion is continuously delivered upwardly in a vertical column to one end of an evacuated mixing zone or chamber. By delivering the emulsion in a vertical column, the rate of the emulsion introduced into the chamber may be regulated entirely by a pumping mechanism, under the control of an operator, since the weight of a vertical column of emulsion and the frictional drag of the emulsion will overcome the pull of the vacuum within the mixing chamber. A subatmospheric environment is maintained in the mixing chamber in the range of 15–27½ inches Hg. vacuum, preferably 20 inches Hg.

Within the mixnig chamber the continuous stream of moving emulsion is maintained at a suitable constant level leaving a large volume evacuated space thereabove. The emulsion flows from the delivery end of the chamber to the opposite, discharge end while undergoing constant agitation by rotating paddles or blades. Emulsion is flowed through the apparatus at a rate of up to 120 pounds per minute, preferably at about 40 pounds per minute, and is exposed to the vacuum during a transit time of about five minutes.

It is preferred that the emulsion be discharged from the mixing chamber downwardly by gravity. Where subsequent processing of the evacuated and mixed emulsion is at a constant rate equal to the delivery rate, the stream of emulsion could be discharged directly thereto through a vertical column of similar dimensions to the abovementioned delivery column which may be devised to overcome the vacuum and flow emulsion out of the chamber. However, it is preferable, particularly where subsequent processing may require emulsion at a variable rate, to first transfer the evacuated and mixed emulsion downwardly into a holding zone or hopper. In such an instance, it is also preferable that the hopper or holding zone also be subjected to a subatmospheric environment so as to prevent subsequent introduction of air into the treated emulsion and to permit the emulsion to flow from the mixer. Also, it is preferable that emulsion be discharged from the holding zone by gravity downwardly to minimize any working of the emulsion subsequent to the controlled mixing step. Discharge of the emulsion from the holding zone may be suitably effected through a pump which will prevent the entrance of air into the evacuated system, upon start-up, from points downstream of the holding zone, and positively remove emulsion from the system.

Figure 1:
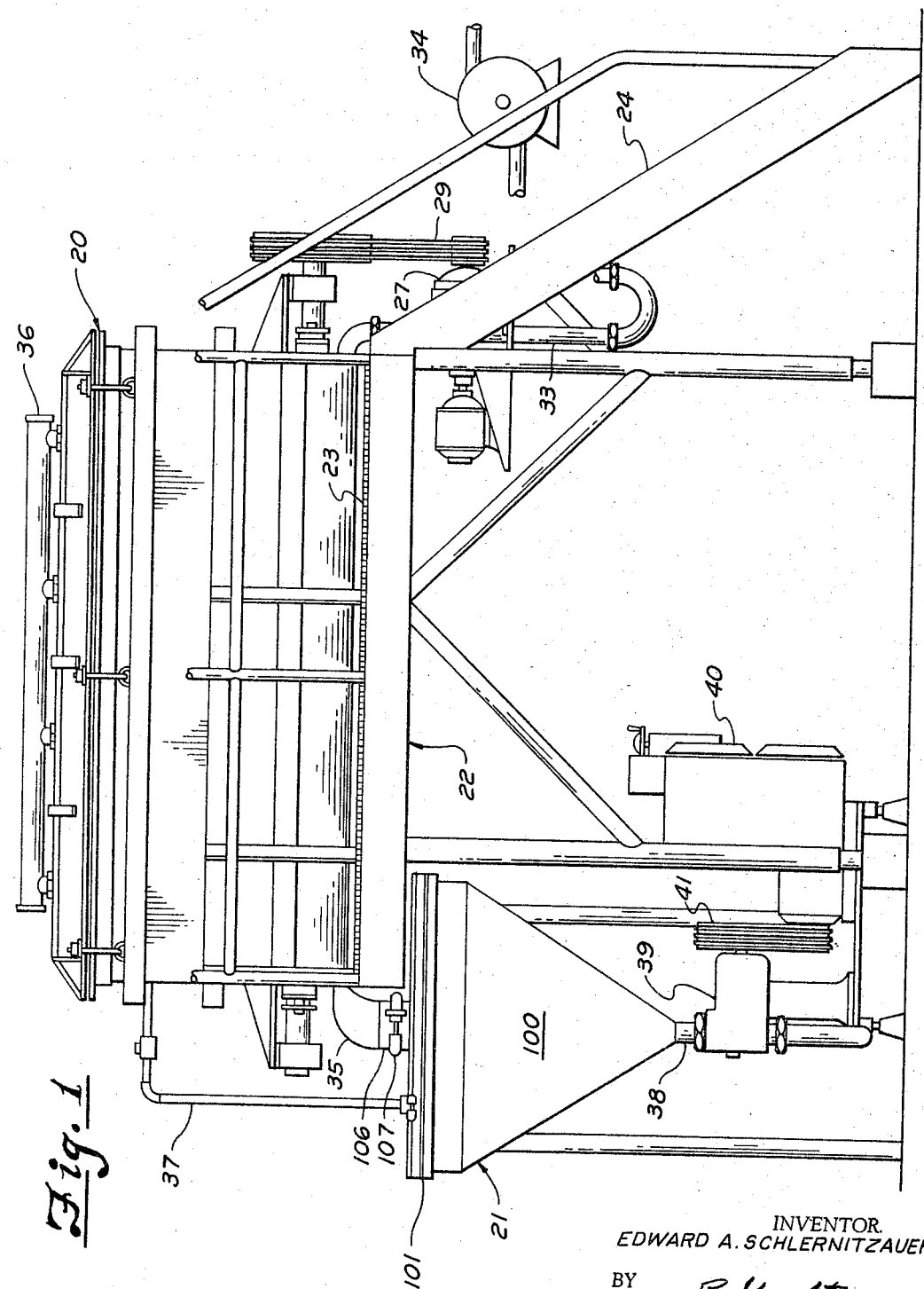
FIGURE 1 is an overall elevation view of the preferred apparatus of the present invention.
Figure 2:
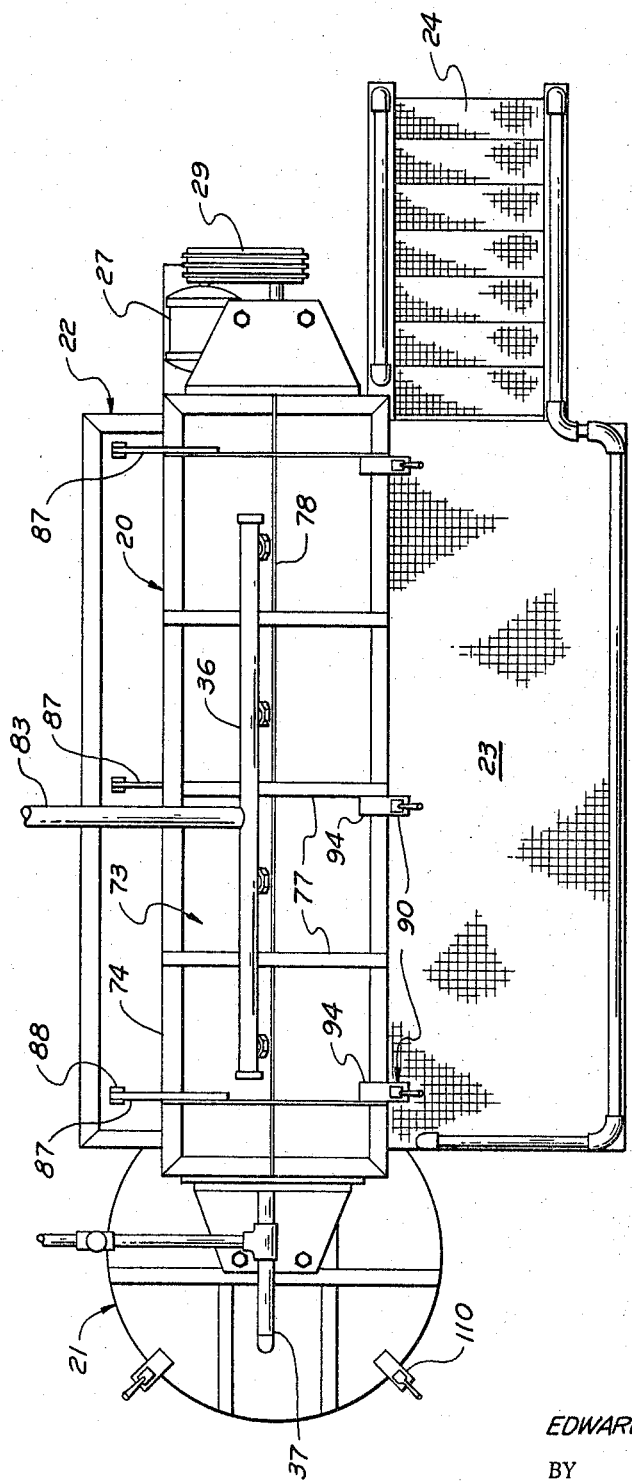
FIGURE 2 is a plan view of the apparatus of FIGURE 1.
Figure 3:
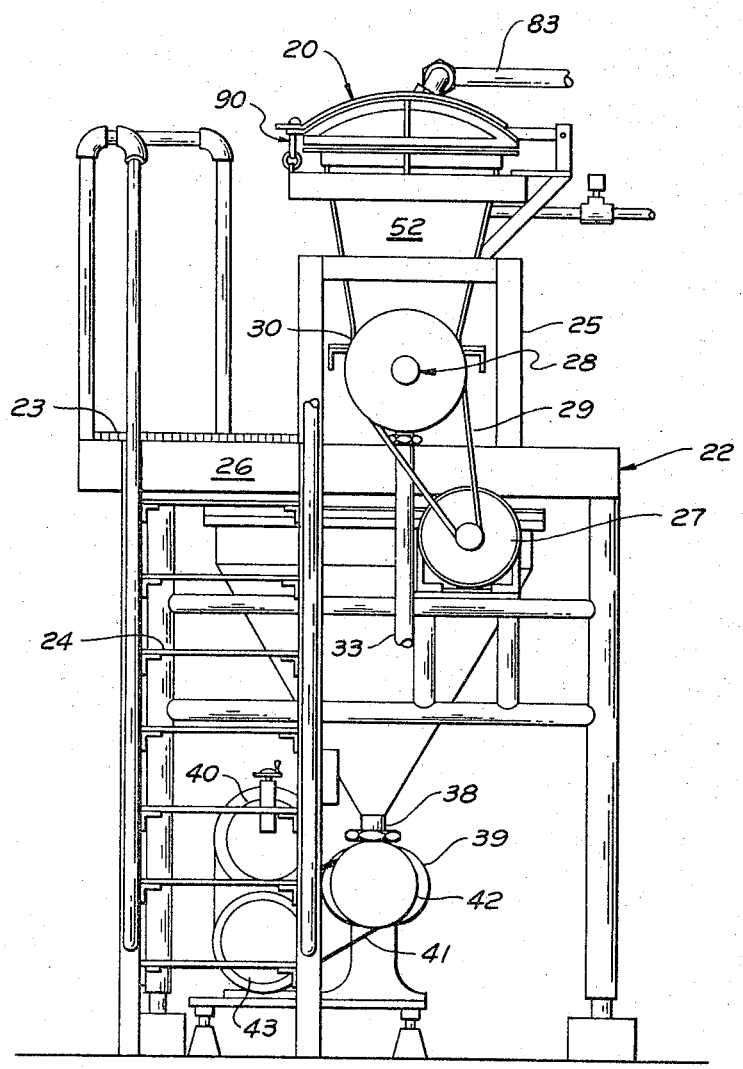
FIGURE 3 is an end view of the apparatus of FIGURE 1.

Basically a preferred apparatus, shown in FIGURES 1–3, comprises two chamber assemblies, namely a mixer chamber generally 20, and a hopper chamber generally 21. Because of the size of the apparatus and the advantage of gravity flow achieved by mounting the mixer 20 above the hopper 21, a platform generally 22 is also provided. One side of the platform 22 constitutes a personnel deck 23 accessible by a ladder 24.

The mixer generally 20 is supported above the platform 22 by a superstructure 25 extending upwardly from the platform crosspieces 26. A motor-gear reducer assembly 27 is mounted beneath the platform for driving a mixer shaft generally 28 extending through the mixer 20. The motor-gear reducer 27 is drivingly connected to the mixer shaft 28 by means of conventional belting 29 and sheaves 30.

A downwardly extending vertical delivery pipe 33 is connected between the bottom of one end of mixer 20 and a pump 34 for forcing food emulsion from a source, not shown. At the opposite end of the mixer 20 a transfer conduit 35 extends downwardly to the hopper generally 21. A vacuum manifold 36 extends substantially the length of the mixer 20 and is connected at a plurality of points to the upper portion thereof; and a vacuum tube 37 is connected between the upper portion of the mixer 20 and the top of the hopper 21.

The hopper 21 is preferably of a conical shape, as illustrated, terminating at its lower end in a discharge pipe 38 connected to a pump 39 and thence through a further pipe to a subsequent processing line, not shown. A variable speed drive 40 is drivingly connected to the pump 39 by means of belting 41 extending between a pulley 42 on the pump and a pulley 43 on the variable drive 40.

With further regard to the mixer generally 20, the details of which may be seen best in FIGURES 4 and 5, a vessel generally 47 is comprised of a flared U-shaped sheeting forming opposite outwardly flared sides 49, 50 above a bottom U-shaped trough 51, and a pair of congruent end plates 52, 53 at the delivery and discharge ends, respectively. The upper edges of sides 49, 50 and ends 52, 53 terminate at a rim flange 54. Rigidity is imparted to the vessel 47 by a series of rectangular frame stiffeners 55, 56, 57, comprised of metal angles longitudinally encircling the mixer.

The lower stiffener member 57 extends into an end bracket 58, 59 at the discharge and delivery ends respectively of the vessel 47 and supports depending external bearings 60, 61 for the mixer shaft generally 28. Packing glands 65, 66 are secured in openings in each of the end plates 52, 53, respectively, in line with the bearings 60, 61. A circular delivery opening is provided in the delivery end plate 52, and a delivery plate elbow 68 is connected therewith. At the opposite end in plate 53 a discharge opening 69, of elliptical shape, is provided, and the transfer conduit 35 is connected therewith.

The vessel 47 is provided with a cover generally 73 having a rectangular rim 74, constructed of box tubing on the underside of which is secured a neoprene gasket which forms an airtight seal between the cover rim 74 and vessel rim flange 54, when the latter are closed together. The cover closure is formed of an arcuate panel 76 having both a plurality of lateral stiffeners 77 and at least one longitudinal stiffener 78. A plurality of vacuum fittings 79 are positioned off center to one side of the longitudinal stiffener 78, and angled from the vertical. A baffle plate 80 is positioned below the arcuate panel 76, and extending substantially the length thereof, beneath the vacuum fittings 79. It will be noted that the latter fittings 79 are threaded to be readily connected and disconnected with the longitudinal vacuum manifold 36 through an equal number of threaded union joints 82. A single vacuum line 83 is connected between the midsection of the manifold 36 and a source of vacuum, not shown.

It will be noted in the figures that the cover generally 73 is hingedly connected to the vessel 47 along the side opposite the personnel deck 23, to enable servicing and cleaning of the equipment. The hinge assembly comprises a plurality of horizontal bars 87 extending from the lateral cover stiffeners 77. The horizontal bars are pivotally received in bifurcated ends of an equal number of side braces 88 extending upwardly from that side of the vessel 47. Pivot pins 89 hingedly connect bars 87 in the bifurcated braces 88. The opposite side of the cover 73 is releasably secured to the vessel 47 by means of a plurality of latches generally 90.

The latter comprise a plurality of eyebolts 91, the eyes of which are pivotally connected to the upper stiffener member 55. The eyebolts may be secured in place by wing nuts, not shown, or preferably, eccentric cam handles 92 are rotatably fitted on internally threaded stub shafts, which in turn are screwed on the ends of eyebolts 91. The upper ends of the eyebolts may be received in notched brackets 94 which are welded to the cover rim 74. Thus, to secure the cover 73 in closed position upon the vessel 47 it is merely necessary to pivot each of the eyebolts 91 into the notched brackets 94 and secure them in that attitude. To release, the eyebolts 91 are simply disengaged from the brackets 94.

The construction of the emulsion hopper generally 21 may be best seen in FIGURES 1 through 3 and 6. The hopper comprises a chamber formed of a conical wall 100 closed at the upper, larger diameter, end by a cover 101 and terminating at the lower, narrow diameter, end in the discharge pipe 38. It will be understood that the cover 101 includes a vertical peripheral rim and a circular gasket for sealably engaging the upper edge of the chamber conical wall 100. A plurality of stiffener members 104, perpendicular to one another, are provided on the cover 101 for rigidity. The cover includes a circular opening 105 which is adapted to receive the lower end of the transfer conduit 35 extending from the elliptical discharge opening 69 of the mixer generally 20. Preferably the transfer conduit 35 is of a shape changing from an elliptical opening at the mixer end to a circular opening at the hopper end, the latter being of a diameter approximately equal to the major axis of the elliptical opening.

The opening 105 in the cover 101 is slightly larger than the latter diameter and is embraced by an upstanding collar 106 which is fastened to the transfer conduit 35 by a grommet 107. The cover 101 also includes a small diameter vacuum port 108 adapted to receive the vacuum tube 37 which extends into the upper portion of the mixer generally 20 and serves to evacuate the interior of the hopper generally 21. A baffle plate 109 is secured to the underside of the cover 101 beneath the vacuum port 108 to prevent fouling of the vacuum tube 37. A plurality of latches generally 110, similar in structure to latches 90, are provided for securing the cover 101 to the conical wall 100.

Referring to FIGURES 4 and 7 the structure of the agitator member for the mixer generally 20 may be seen. The mixer shaft generally 28 is partially shown in FIGURE 4 to preferably comprise 3 parts, namely a hollow mounting shaft 116, positioned entirely within the mixer vessel 47, and bearing shafts 117, 118, extending through the packing glands 65, 66 in the two opposite end plates 52, 53, respectively, of the mixer generally 20. The mounting shaft 116 contains a plurality of mounting holes located helically throughout the length of the mounting shaft spaced radially 120° and longitudinally 1″ from one another. Preferably the mounting holes 119 extend through opposite walls of the shaft to facilitate the mounting of a plurality of mixing blades 120, which comprise a truncated circular segment 121 mounted upon a threaded stem 122. The stems 122 of the blade are adapted to extend through the mounting holes and be secured therein by nuts or the like, not shown. Also, as may be seen in FIGURE 7, each segment 121 of each mixing blade 120 is preferably an approximately 60° segment with both radial side edges 123 beveled to form tapered edges. Also, the stems of the endmost mixing blades serve to lock the mounting shaft 116 onto the respective bearing shafts 117, 118 by reason of the fact that the latter include short stubs extending into the former, both containing holes—not shown, through which the stems extend.

An installation of the foregoing described preferred embodiment designed with an operating capacity of about 150 pounds of emulsion and capable of processing approximately 6,000 pounds per hour of meat emulsion comprises a mixer generally 20, approximately 7 feet long, 2 feet 9 inches high, and 1 foot 10 inches wide at the top. The trough 51 of the mixer was bent to approximately 6 inch radius; and the mixer unit was positioned approximately 6 feet above floor level on the platform 22. The emulsion delivery conduit for this unit was 3 inch diameter piping; and emulsion was maintained to a level approximately 12 inches above the trough bottom. Four vacuum ports were provided, the outer ports being 2 inch diameter and the inner ports 1½ inches diameter, all connected to a 2½ inch diameter vacuum manifold 36. Emulsion was constantly agitated within this mixer by the above-described agitator assembly wherein the blades were constructed of quarter inch sheet metal cut in an arc of approximately 6 inch radius to provide blades of approximately 6 inch cord length and 4½ inch height. The edges of the blades were beveled at a 75° angle from a line perpendicular to the blade edge. The emulsion was discharged from the mixer through an elliptical opening of approximately 6 inches by 3 inches dimension through a transfer conduit 35 terminating about 1 foot beneath the mixer in a 6 inch diameter opening of a hopper 21 in the form of a cone approximately 3 feet high and 3 feet 4 inches diameter at the top. A 3 inch discharge pipe was connected to the bottom of the conical hopper.

Obviously many modifications and variations of the invention as hereinbefore set forth may be made without departing from the spirit and scope thereof, and therefore only such limitations should be imposed as are indicated in the appended claims.

I claim:

1. An improved method for continuously vacuum-mixing a stream of meat emulsion, said method comprising: exhausting the atmosphere of a mixing zone to a vacuum of about 15–27½ inches Hg; continuously delivering a stream of meat emulsion to one end of said mixing zone, said stream being conducted to said mixing zone through an enclosed passage at least part of which is disposed upwardly whereby the weight of emulsion and frictional drag therein substantially overcomes the pull of said vacuum in said zone; constantly agitating a flowing body of said emulsion throughout said mixing zone; transferring a continuous stream of said emulsion from the opposite end of said mixing zone downwardly to a holding zone; evacuating said holding zone through said mixing zone to substantially the same level of vacuum therein; and pumping emulsion from the bottom of said holding zone.

2. An improved apparatus for continuously vacuum-mixing food emulsion, said apparatus comprising: a mixing chamber means for maintaining a flowing body of emulsion; a delivery means for introducing a continuous stream of emulsion to one end of said mixing chamber means; an evacuating means connected to exhaust the atmosphere from within said mixing chamber means; agitating means mounted within said mixing chamber means for mixing the emulsion flowing therein; holding chamber means positioned for receiving a continuous stream of emulsion from said mixing chamber means; transfer means for removing emulsion from an opposite end of said mixing chamber means and delivering said emulsion to said holding chamber means; means to exhaust the atmosphere from said holding chamber means; and discharging means connected to said holding chamber means for removing emulsion therefrom.

3. The apparatus of claim 2 wherein the means to exhaust atmosphere from said holding chamber means is a separate connection between said holding chamber means and said mixing chamber means.

4. The apparatus of claim 2 wherein said holding chamber means is positioned below said mixing chamber means and both said delivery and discharge means include vertical pipes for containing columns of product below said mixing chamber means and holding chamber means, respectively.

5. The apparatus of claim 2 wherein said delivery and discharge means include pumping means.

6. An improved apparatus for continuously vacuum-mixing meat emulsion, said apparatus comprising: a mixing chamber; means for continuously delivering meat emulsion to an end of said chamber; a vacuum manifold connected at a plurality of points to the top of said chamber; a rotatable agitator extending longitudinally within the bottom of said mixing chamber from said one end to an opposite end for agitating said emulsion and propelling it toward said opposite end; a transfer conduit extending downwardly from said opposite end of said mixing chamber; an enclosed conical hopper connected to said transfer conduit beneath said mixing chamber for receiving emulsion therefrom; a vacuum tube connected between the top of said hopper and the top of said mixing chamber; and discharging means connected to the bottom of said hopper for removing emulsion therefrom.

7. An improved apparatus for continuously vacuum-mixing meat emulsion, said apparatus comprising: a mixing chamber; a downwardly extending vertical delivery pipe connected to the bottom of one end of said chamber for delivering emulsion thereto; a vacuum manifold connected at a plurality of points to the top of said chamber; a rotatable agitator extending longitudinally within the bottom of said mixing chamber from said one end to an opposite end for agitating said emulsion and propelling it toward said opposite end; a transfer conduit extending downwardly from said opposite end of said mixing chamber; an enclosed conical hopper connected to said transfer conduit beneath said mixing chamber for receiving emulsion therefrom; a vacuum tube connected between the top of said hopper and the top of said mixing chamber; a discharge pipe connected to the bottom of said hopper; and a variable speed pump in said discharge pipe for removing emulsion from said hopper.

8. The method of claim 1 wherein the atmosphere of said mixing and holding zones is exhausted to a vacuum of about 20 inches Hg.

References Cited by the Examiner

UNITED STATES PATENTS

| | | | |
|---|---|---|---|
| 2,298,644 | 10/1942 | Hummel | 107—14 X |
| 2,792,304 | 5/1957 | Pavan | 107—54 X |
| 2,907,662 | 10/1959 | Covey | 99—109 X |
| 2,931,320 | 4/1960 | Bandel | 259—9 X |
| 3,090,606 | 5/1963 | Burnet | 259—9 X |

WILLIAM I. PRICE, *Primary Examiner.*